United States Patent
Evenson

(10) Patent No.: US 9,614,891 B1
(45) Date of Patent: Apr. 4, 2017

(54) ASSEMBLING COMMUNICATIONS BASED ON CAPTURED PACKETS

(71) Applicant: AMAZON TECHNOLOGIES, INC., Reno, VA (US)

(72) Inventor: Andrew Ross Evenson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 242 days.

(21) Appl. No.: 14/033,852

(22) Filed: Sep. 23, 2013

(51) Int. Cl.
*H04L 29/08* (2006.01)

(52) U.S. Cl.
CPC .................................. *H04L 67/02* (2013.01)

(58) Field of Classification Search
USPC ....... 709/217, 218, 219, 220, 221, 222, 223, 709/224, 225, 226, 227, 230, 236, 238, 709/245, 250; 370/241, 250, 474, 252, 370/389, 463, 408, 351; 719/321
See application file for complete search history.

(56) References Cited

U.S. PATENT DOCUMENTS

| | | | | |
|---|---|---|---|---|
| 6,427,169 B1* | 7/2002 | Elzur | ............................ | 709/224 |
| 6,961,777 B1* | 11/2005 | Hariharasubrahmanian | . | 709/230 |
| 7,170,878 B2* | 1/2007 | Fukuda | ........................ | 370/338 |
| 7,191,240 B1* | 3/2007 | Johnson | ........................ | 709/230 |
| 7,197,046 B1* | 3/2007 | Hariharasubrahmanian | . | 370/466 |
| 7,284,071 B2* | 10/2007 | Jones et al. | ................... | 709/250 |
| 7,308,000 B2* | 12/2007 | Masputra et al. | ............ | 370/469 |
| 7,512,128 B2* | 3/2009 | DiMambro et al. | .......... | 370/393 |
| 7,958,530 B2* | 6/2011 | Fukuda | .................. | H04H 60/32 370/395.52 |
| 8,400,919 B1* | 3/2013 | Amdahl et al. | ............ | 370/230.1 |
| 2001/0037397 A1* | 11/2001 | Boucher et al. | .............. | 709/230 |
| 2002/0147839 A1* | 10/2002 | Boucher et al. | .............. | 709/238 |
| 2002/0156927 A1* | 10/2002 | Boucher et al. | .............. | 709/250 |
| 2002/0181480 A1* | 12/2002 | Puleston | ........................ | 370/408 |
| 2002/0199019 A1* | 12/2002 | Battin et al. | ................... | 709/245 |
| 2004/0030790 A1* | 2/2004 | Le et al. | ........................ | 709/230 |
| 2004/0054813 A1* | 3/2004 | Boucher et al. | .............. | 709/250 |
| 2004/0062267 A1* | 4/2004 | Minami et al. | ................ | 370/463 |
| 2004/0064578 A1* | 4/2004 | Boucher et al. | .............. | 709/236 |
| 2004/0073655 A1* | 4/2004 | Kan | .................... | H04L 12/2602 709/224 |
| 2004/0073703 A1* | 4/2004 | Boucher et al. | .............. | 709/245 |
| 2005/0038895 A1* | 2/2005 | Mohamed et al. | ........... | 709/230 |
| 2006/0233116 A1* | 10/2006 | Kyusojin et al. | ............. | 370/252 |

(Continued)

Primary Examiner — Saket K Daftuar
(74) Attorney, Agent, or Firm — Lindauer Law, PLLC

(57) ABSTRACT

Techniques are described for analyzing communication data packets captured at a computing device, and identifying subsets of packets that carry data for a connection or a communication involving the computing device. Incoming and outgoing packets may be captured using a packet capture process that executes separately from the services involved in the communications. A subset of the captured packets is determined that correspond to a transport layer connection carrying communications with a remote system. A sequence of packets associated with an application layer communication may be reconstructed by analyzing the subset of packets associated with the connection. The packets associated with the application layer communication or the transport layer connection may be stored in order, and accessed to diagnose communication issues.

19 Claims, 9 Drawing Sheets

(56) References Cited

U.S. PATENT DOCUMENTS

| | | | |
|---|---|---|---|
| 2007/0162777 A1* | 7/2007 | Imao | G06F 1/3209 |
| | | | 713/320 |
| 2007/0223472 A1* | 9/2007 | Tachibana et al. | 370/389 |
| 2008/0049629 A1* | 2/2008 | Morrill | 370/250 |
| 2008/0049631 A1* | 2/2008 | Morrill | 370/250 |
| 2008/0049632 A1* | 2/2008 | Ray et al. | 370/250 |
| 2008/0049638 A1* | 2/2008 | Ray et al. | 370/252 |
| 2008/0137855 A1* | 6/2008 | Enomoto et al. | 380/255 |
| 2008/0301320 A1* | 12/2008 | Morris | 709/238 |
| 2009/0074009 A1* | 3/2009 | Kuliner | 370/474 |
| 2009/0154496 A1* | 6/2009 | Fujinami | H04W 80/02 |
| | | | 370/469 |
| 2010/0131667 A1* | 5/2010 | Nie | 709/230 |
| 2011/0299537 A1* | 12/2011 | Saraiya et al. | 370/392 |
| 2013/0145035 A1* | 6/2013 | Pope et al. | 709/227 |
| 2014/0119196 A1* | 5/2014 | Hui et al. | 370/241 |
| 2014/0359052 A1* | 12/2014 | Joachimpillai et al. | 709/217 |

* cited by examiner

ASSEMBLING COMMUNICATIONS BASED ON CAPTURED PACKETS

BACKGROUND

Computing environments may include any number of software or hardware modules that communicate with one another in the course of their operation. Services that involve multiple modules may not operate as designed when communications between modules fail, or when incorrect or incomplete data is communicated. In some cases, it may be difficult to identify the source of communication errors, particularly in environments where there may be incomplete system documentation or where non-standard communication libraries are in use.

Figure 1:
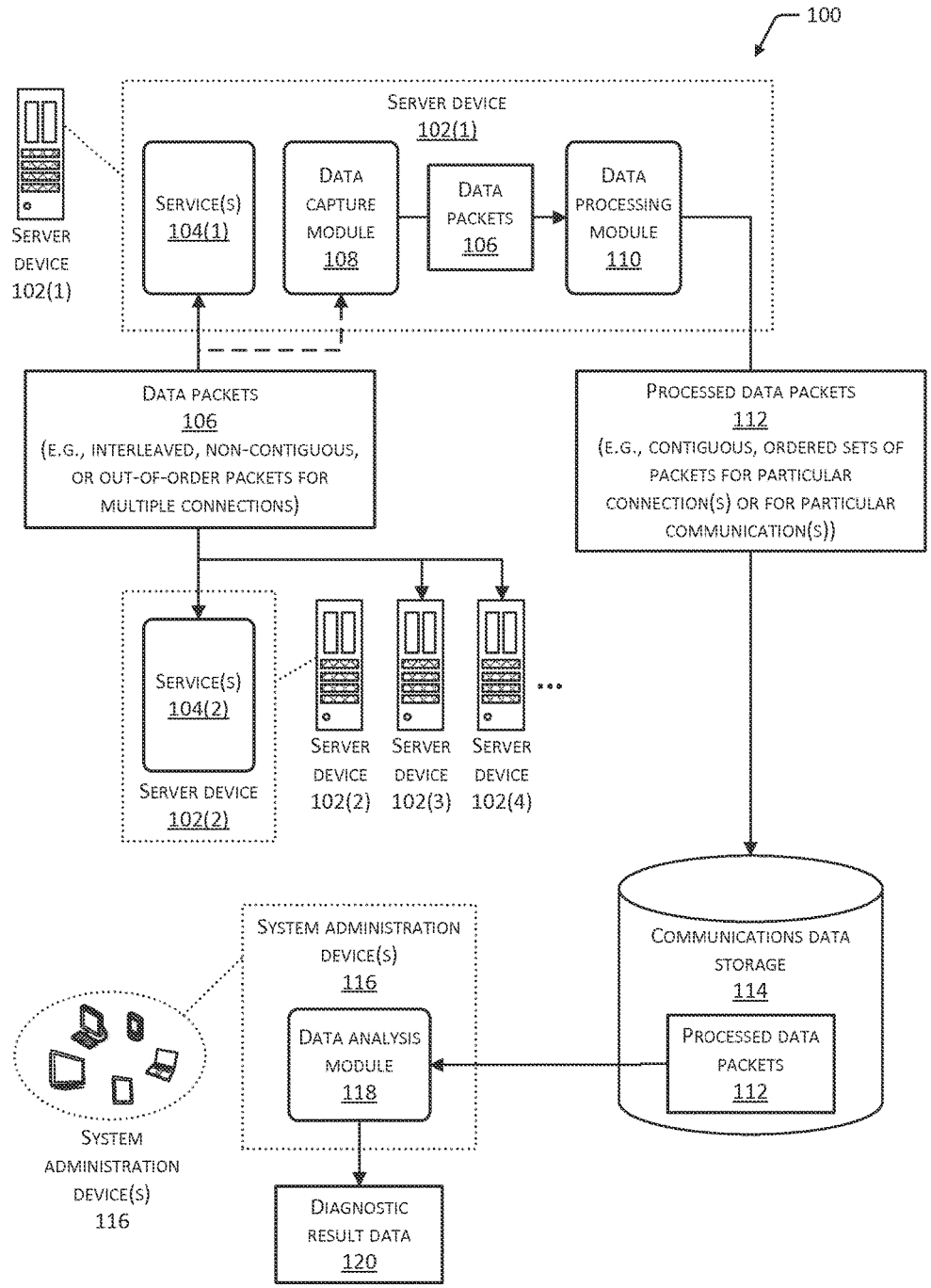
FIG. 1 depicts an environment for assembling communications between modules based on an analysis of captured data packets.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for analyzing captured data packets corresponding to multiple connections between a first computing device and other computing devices, and reconstructing contiguous, time-ordered sequences of data packets corresponding to particular connections or higher layer communications carried within the connections. In some cases, the connections may operate at a particular layer of a multi-layer communication model such as the Open Systems Interconnection (OSI) networking model. For example, the connections may operate at a transport layer such that the time-ordered sequences of data packets include Transmission Control Protocol (TCP) packets, User Datagram Protocol (UDP) datagrams, and so forth. In some implementations, the data packets corresponding to a connection at a first layer (e.g., a transport layer) may be further analyzed to determine one or more communications that are carried by the connection, wherein the communication(s) operate at a second layer that is higher than the first layer (e.g., an application layer). For example, the data packets corresponding to a transport layer connection may be analyzed to identify one or more Hypertext Transfer Protocol (HTTP) communications such as HTTP requests or responses that are carried by the transport layer connection. In such cases, the time-ordered, contiguous sequence of data packets corresponding to one or more application layer communications may be stored.

The stored data packets corresponding to a one or more of a transport layer connection or an application layer communication may be retrieved and analyzed to diagnose network issues, or debug communication operations performed by applications or services. For example, within a plurality of software modules that provide an online service such as an e-commerce web site, incorrect data for a particular transaction may be sent between modules, or a module may fail to send relevant data. In such cases, the stored data packets may be employed to reconstruct the one or more connections or communications that were employed to send, or attempt to send, the relevant data. Based on the reconstruction, a source of the failure may be traced or otherwise diagnosed. The stored data packets may also be employed to replay one or more transactions, and to test or debug one or more software modules involved in the transaction(s). Testing may include performance testing, functional testing, testing for compliance to design specifications or industry standards, usability testing, and so forth. Because the stored data packets may include information at multiple layers of the network stack, the stored data packets may be employed to diagnose problems which may manifest themselves at one layer even though their cause may be found at a different layer.

Moreover, in some cases, the stored data packets corresponding to connection(s) or communication(s) may be employed to determine which software or hardware modules are involved in transmitting data to other software or hardware modules, and what data is being transmitted. In this way, implementations may enable system administrators, software developers, or other parties to better understand the behavior of systems that include large numbers of interacting modules, when implementations are employed in systems that include legacy software that may be inadequately documented. For example, by analyzing the stored data packets for one or more connections or communications, a determination may be made that a software module A executing on a computing device X communicates with a software module B executing on a computing device Y, and that modules A and B communicate data Q corresponding to a particular type of transaction or service. Such information may facilitate the deployment of new services or devices to either replace or interoperate with older services or devices.

A data packet, also referred to herein as a packet, may describe a sequence, block, or collection of information that is transmittable over a computer network. A packet may be transmittable over a computer network that operates in a packet mode to sequentially transmit packets over one or more communications channels, using packet switching, multiplexing, or other techniques. The data carried in a packet may be at least partly formatted. For example, a packet may include a header portion that includes metadata describing a source or destination of the packet, a type of data carried in the packet, a communication protocol employed to communicate or format the packet, a size of the packet, a timestamp when the packet was generated or sent, and so forth. A packet may also include a payload that comprises the data to be transmitted (e.g., the cargo of a packet). The various packets processed by implementations may include packets at one or more layers of a multi-layer communication model such as the OSI model. For example, the packets captured on a computing device may be Ethernet packets that are transmitted and processed at a data link layer, and the captured Ethernet packets may include data that describes transport layer packets, network layer packets, application layer data, and so forth. A packet may have a predetermined size that may be, in some cases, based on a networking protocol that supports the transmission of the packet. Alternatively, a packet may have a variable size or a size that is within a certain prescribed range. The packets described herein may carry any type of data including but not limited to: formatted or unformatted text data; binary data; video, audio, image, graphics, or any other type of multimedia data; and so forth. The packets at any layer may carry data that is encrypted or unencrypted, and may carry data that is compressed or uncompressed.

Although examples herein describe packets that may be formatted according to a particular networking protocol, such as TCP packets, Ethernet packets, and so forth, implementations are not so limited. In some implementations, packets may include portions of an at least partly unformatted data stream (e.g., byte stream) that is transmitted between hardware or software modules, and the packets may be delineated based on a predetermined size, based on packet-delineating data elements included in the data stream, or according to some other method.

As described herein, modules including hardware and software modules may communicate with one another using one or more connections. Data may be transmitted over a connection unidirectionally (e.g., in a one-way transmission) or bidirectionally (e.g., in a two-way transmission). In the examples herein, a connection may carry transmissions between modules at a first layer that is any layer of a multi-layer communication model such as the OSI model. For example, a connection may be a transport layer connection. A connection may carry information that is exchanged during one or more communication sessions between modules. In some implementations, connections may be pooled and reused. For example, an open, active connection between modules A and B may be reused to enable communications between modules A and C following a completion of communications between modules A and B.

A connection may carry or otherwise enable one or more communications between modules. Such communications may be at a second layer of the multi-layer communication model, that second layer being different than the first layer. In some cases, the second layer may be a higher layer than the first layer, such that second layer packets carrying data for the communication(s) may be included within the payload(s) of one or more first layer packets that include data for the connection. For example, a transport layer connection such as a TCP connection may be employed by one or more application layer communications such as HTTP communications (e.g., HTTP requests, responses, and so forth). In such cases, the payloads of the TCP packets may include data for the HTTP communication(s). Although the examples herein describe application layer information as HTTP information, implementations are not limited to a particular protocol or data format at the application layer. For example, application layer data may include data that is arranged according to a protocol that enables remote method calls such as Remote Procedure Calls (RPCs).

Connections and communications may operate at any layer of a multi-layer communication model, and may include any type of interaction between hardware or software modules. Such interactions may include one or more of the following: a first phase in which the connection or communication is established; a second phase in which data is transferred over the established connection or communication; or a third phase in which the connection or communication is released or terminated.

FIG. 1 depicts an environment 100 for assembling packet sequences that correspond to connections or communications between modules, the assembling based on an analysis of captured data packets. The environment 100 may include a plurality of server devices 102. The server device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. An example of the server device(s) 102 is described further with reference to FIG. 4. In some cases, one or more of the server devices 102 may comprise a cluster, cloud, farm, or other grouping of multiple devices that coordinate operations to provide load balancing, failover support, parallel processing capabilities, shared storage capacity, or other aspects.

One or more of the server device(s) 102 may execute software to provide one or more services 104 of any type. In some cases, the service(s) 104 may include components that are accessible to processes and parties that are external to the environment 100 or external to an organization that operates the server device(s) 102. For example, the service(s) 104 may provide a user interface or other information to external customers, clients, vendors, and so forth. The service(s) 104 may also include components that are internally accessible, such as components for receiving, accessing, retrieving, storing, or processing data related to operations of the server device(s) 102. Such service(s) 104 may provide the infrastructure for operations of a business or other organization.

At least some of the server device(s) 102, the service(s) 104, or both the server device(s) 102 and the service(s) 104 may communicate information to and from one another in the form of data packets 106. Such data packets 106 may include any type of packet as described above. The data packets 106 may be formatted according to any communication protocol. In some cases, the data packet(s) 106 may be Ethernet packets that are formatted according to the Institute of Electrical and Electronics Engineers (IEEE) 802.3 standards describing Ethernet protocols, hardware, and standards. The data packets 106 may also include packets formatted for transmission over a wireless network, such as packets configured according to IEEE 802.11 or 802.16 standards. Accordingly, the data packet(s) 106 may be processed at one or both of a physical layer or a data link layer of the OSI model.

In some implementations, one or more of the server devices 102 may execute a data capture module 108. The data capture module 108 may capture at least a portion of the data packets 106 that are sent by or received at the server device 102 where the data capture module 108 executes. In some implementations, the data capture module 108 executes separately from the various services 104 that are involved in the communication of the data packets 106. In this way, implementations may enable the capture and processing of data packets 106 without regard to the particular design, coding, libraries, or programming languages of the service(s) 104. For example, in cases where the service(s) 104 include legacy software or software that is available in the form of a binary executable, implementations enable the capture and processing of the data packets 106 without instrumenting or otherwise modifying the source code of the service(s) 104.

The data packets 106 may be captured in an order in which they were received, e.g., in a time order according to the times when the data packets 106 arrived at the server device 102. In some cases, the order of the captured data packets 106 may be different than a sequence order in which the data packets 106 were originally sent. Accordingly, the order of the captured data packets 106 may differ from a sequence numbering within the packets, the sequence numbering being associated with an order in which the data packets 106 were originally sent. Implementations are not limited based on the particular ordering of the captured data packets 106 (e.g., the order in which the data packets 106 were captured). In some implementations, the ordering of the captured data packets 106 may be irrelevant to subsequent processing.

In some implementations, the data capture module 108 may be a stand-alone packet capture utility such as the pcap utility available on some Unix™ or Unix™-like operating systems. Alternatively, the data capture module 108 may employ a packet capture application programming interface (API) or library such as libpcap or WinPcap. In some implementations, the data capture module 108 may capture the data packets 106 that are received at or sent from the server device 102 at the data link layer. The data capture module 108 may capture all of the data packets 106 received at or sent from the server device 102. Alternatively, the data capture module 108 may capture a subset of the data packets 106 received at or sent from the server device 102. For example, the data capture module 108 may capture the data packets 106 that are sent or received during a period of time. In some implementations, the data capture module 108 may capture the data packets 106 and output at least some of them to a data processing module 110 executing on the server device 102. Alternatively, the data capture module 108 may write the data packets 106 to storage in memory on the server device 102 or on another device, and the data processing module 110 may subsequently retrieve the stored data packets 106 for processing.

In implementations where the data packets 106 are output to the data processing module 110 without being stored on the server device 102, the data packets 106 may be analyzed and processed in-stream while in the active memory of the executing data processing module 110. Such implementations may enable the data processing module 110 to operate more efficiently with less overhead on the server device(s) 102, given that the contents of the data packets 106 are not duplicated in storage on the server device 102 and given that the total size of the captured data packets 106 may be on the order of terabytes or greater.

Operations of the data processing module 110 are described further with reference to FIGS. 2 and 6-9. Although the data capture module 108 and the data processing module 110 are depicted in the figures as separate modules, implementations are not so limited. In some cases, at least some of the functionality of the data capture module 108 and the data processing module 110 may be implemented in a same module. For example, the data processing module 110 may include an API or library such as libpcap or WinPcap to capture the data packets 106.

In some implementations, the data packets 106 captured by the data capture module 108 include packets that correspond to different connections between the server device 102(1) (e.g., the device where the data capture module 108 and the data processing module 110 are executing) and various other server devices 102. Accordingly, the captured data packets 106 for a particular connection may be non-contiguous in time and interleaved with packets that correspond to one or more other connections. In some cases, the captured data packets 106 for a particular connection may be out of order in time, given the potentially different latencies or speeds of various network paths that may be followed by different packets. The data processing module 110 may output processed data packets 112 to be stored in communications data storage 114. The processed data packets 112 may include one or more sequences of the data packets 106, wherein each sequence is a time ordered, contiguous sequence of packets corresponding to a particular connection (e.g., a transport layer connection) or a particular communication (e.g., an application layer communication). The processed data packet(s) 112 stored in the communications data storage 114 may be accessed and analyzed by one or more system administration devices 116.

The communications data storage 114 may comprise any number of data storage systems that employ any type of data storage technology, including relational databases, non-relational databases, or both relational and non-relational databases. Although the communications data storage 114 is depicted in FIG. 1 as external to the other devices of environment 100, implementations are not so limited. In some implementations, the communications data storage 114 may be at least partly incorporated into the server device(s) 102 or the system administration device(s) 116 as local storage.

The system administration device(s) 116 may comprise any type of computing device, including but not limited to the computing device types listed above with reference to the server device(s) 102. An example of the system administration device(s) 116 is described further with reference to FIG. 5. In some cases, the system administration device(s) 116 may comprise a cluster, cloud, farm, or other grouping of multiple devices that coordinate operations to provide load balancing, failover support, parallel processing capabilities, shared storage capacity, or other aspects. In some implementations, one or more functions or operations of the system administration device(s) 116 may be performed on one or more server devices 102.

In some implementations, the system administration device(s) 116 may execute a data analysis module 118. The data analysis module 118 may access one or more of the processed data packets 112 stored in the communications data storage 114, and analyze the processed data packets 112 to generate diagnostic result data 120. For example, where an operator (e.g., a system administrator) of the system administration device(s) 116 employs the processed data packet(s) 112 to investigate corrupt or incomplete data transmitted between server devices 102, the diagnostic result data 120 may include an identification of a server device 102 or a service 104 that is the origin of the corrupt or incomplete data. The data analysis module 118 may also employ the processed data packet(s) 112 to replay or test a particular transmission of data over a connection or communication. In some cases, the data analysis module 118 may also employ the processed data packet(s) 112 to identify which server devices 102 or which services 104 engage in communications with other server devices 102 or other services 104 in the environment 100. In this way, implementations may enable the reconstruction or mapping of interactions between multiple server devices 102 or services 104 within the environment 100 in cases where the previous documentation or knowledge of such interactions may be limited. Such a reconstruction or mapping may be employed to determine how to deploy new services or devices to interact with or replace existing services or devices.

In some implementations, the processed data packet(s) 112 stored in the communications data storage 114 may be of a same format as the originally captured data packet(s) 106. For example, in some cases the data packet(s) 106 may be Ethernet packets that are described using a format that is associated with the data capture module 108 (e.g., libpcap), and the processed data packet(s) 112 may also be stored as Ethernet packets in a same or similar format in the communications data storage 114. In this way, implementations may enable a substantially complete set of information, e.g., data at multiple layers of a multi-layer communication model, to be stored for the data packets 106 associated with a particular connection or communication. Because a substantially complete set of information may be thus preserved, implementations may enable the diagnosis of a data transmission problem at a particular layer in situations where the origin of the problem may be found at a different layer. For example, a particular HTTP request or response may fail due to a failure in transmitting TCP packets at the transport layer such as a drop of an ACK or SYN-ACK packet at the transport layer. In some cases, implementations enable the tracing of a problem as far as the lowest level packet that was transmitted, such as the first layer data 302 (e.g., the data link layer information, which is described further in reference to FIG. 3).

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 2:
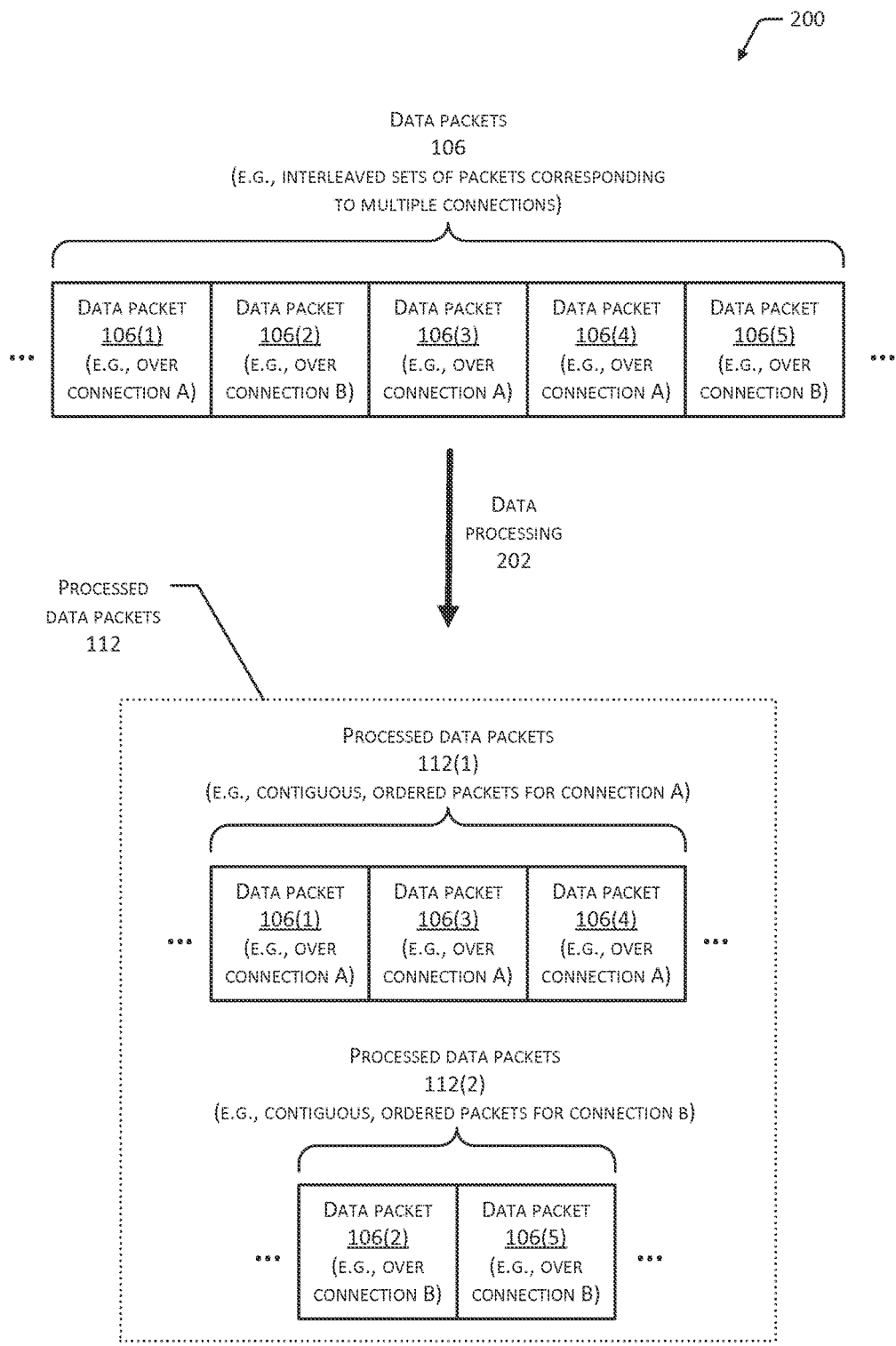
FIG. 2 depicts a schematic illustrating data processing operations that may be performed to determine, based on extracted data packets, ordered sequences of data packets that correspond to particular connections or communications.

FIG. 2 depicts a schematic 200 illustrating data processing operations that may be performed by the data processing module 110, the data analysis module 118, or other modules executing on the various devices shown in FIG. 1. As described above, the data packets 106 captured at a server device 102 may include packets corresponding to multiple connections, and packets for one connection may be non-contiguous and interleaved with other packets within the stream of packets captured by the data capture module 108. In some cases, the packets for one connection may be interleaved in time with packets from another connection. For example, a packet from a first connection may be received at the server device 102, followed by one or more packets from a second connection, a third connection, a fourth connection, and so forth. In some cases, the data packets 106 may include duplicate packets, or packets that are out of order in the captured stream of packets due to packet rebroadcast or for other reasons. In the example shown in FIG. 2, the data packets 106 may include data packets 106(1), 106(3), and 106(4) that correspond to connection A, interleaved with data packets 106(2) and 106(5) that correspond to connection B. Through data processing 202 performed by the data processing module 110, the data analysis module 118, or elsewhere, multiple sequences of the processed data packets 112 may be generated. In the example of FIG. 2, two sequences of processed data packets 112 are generated: a first sequence of processed data packets 112(1) that includes packets corresponding to connection A, and a second sequence of processed data packets 112(2) that includes packets corresponding to connection B. Each sequence of the processed data packets 112 may include any number of packets that are time-ordered and contiguous. Moreover, the processed data packets 112 may include any number of packet sequences that correspond to particular communications (e.g., application layer communications) instead of or in addition to packet sequence(s) that correspond to particular connections (e.g., transport layer connections).

Figure 3:
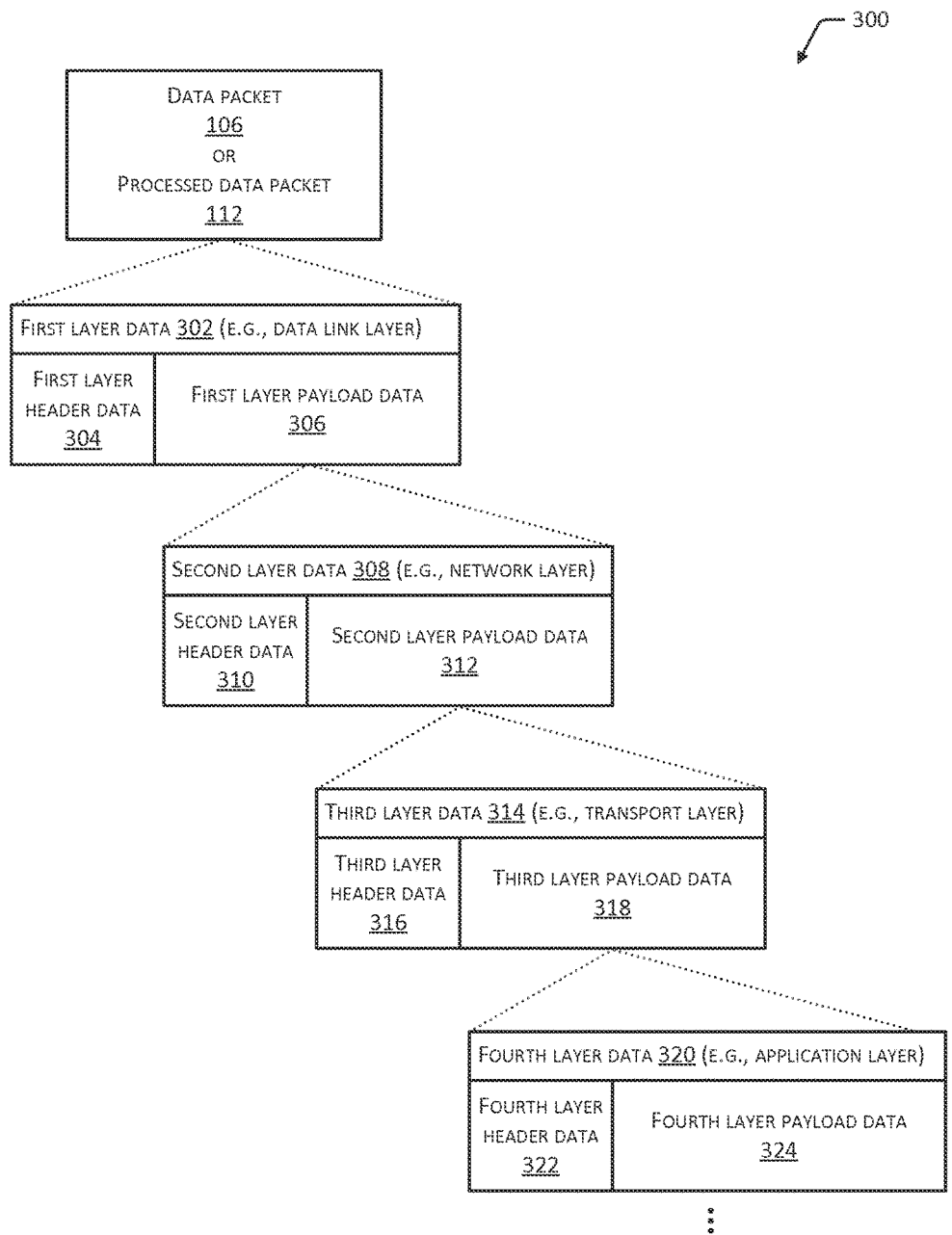
FIG. 3 depicts a schematic of an example data packet that includes nested data corresponding to multiple layers of a multi-layer communication model.

FIG. 3 depicts a schematic 300 of an example data packet 106, or an example processed data packet 112, that includes nested data corresponding to multiple layers of a multi-layer communication model. As described above, in some implementations the multi-layer communication model may be the OSI networking model. Implementations may also support other communication models wherein communications are described at any number of layers.

In the example of FIG. 3, the data packet 106 or the processed data packet 112 may be an Ethernet packet that is processed at a first layer (e.g., a data link layer) of the multi-layer communication model. As such, the packet includes first layer data 302 comprising data that may be received, sent, or processed at a first layer of a networking stack. In some cases, the first layer data 302 may include first layer header data 304 and first layer payload data 306, for a header and payload as described above. The first layer payload data 306 may include second layer data 308, data that may be received, sent, or processed at a second layer (e.g., the network or Internet layer of the OSI model). The second layer data 308 may include second layer header data 310 and second layer payload data 312. As such, the second layer data 308 may be described as a second layer packet, such as an Internet Protocol (IP) packet at the network layer. The second layer payload data 312 may include third layer data 314 that may be described as a third layer packet, such as a TCP packet or a UDP datagram at the transport layer. The third layer data 314 may include third layer header data 316 and third layer payload data 318. The third layer payload data 318 may include fourth layer data 320. The fourth layer data 320 may include fourth layer header data 322 and fourth layer payload data 324. Fourth layer data 320 may be described as a fourth layer packet, such as an HTTP communication or a portion of an HTTP communication (e.g., a HTTP request or response). In this way, the data packet 106 or the processed data packet 112 may include any number of nested packets, where each nested packet is associated with a different layer of the multi-layer communication model.

Figure 4:
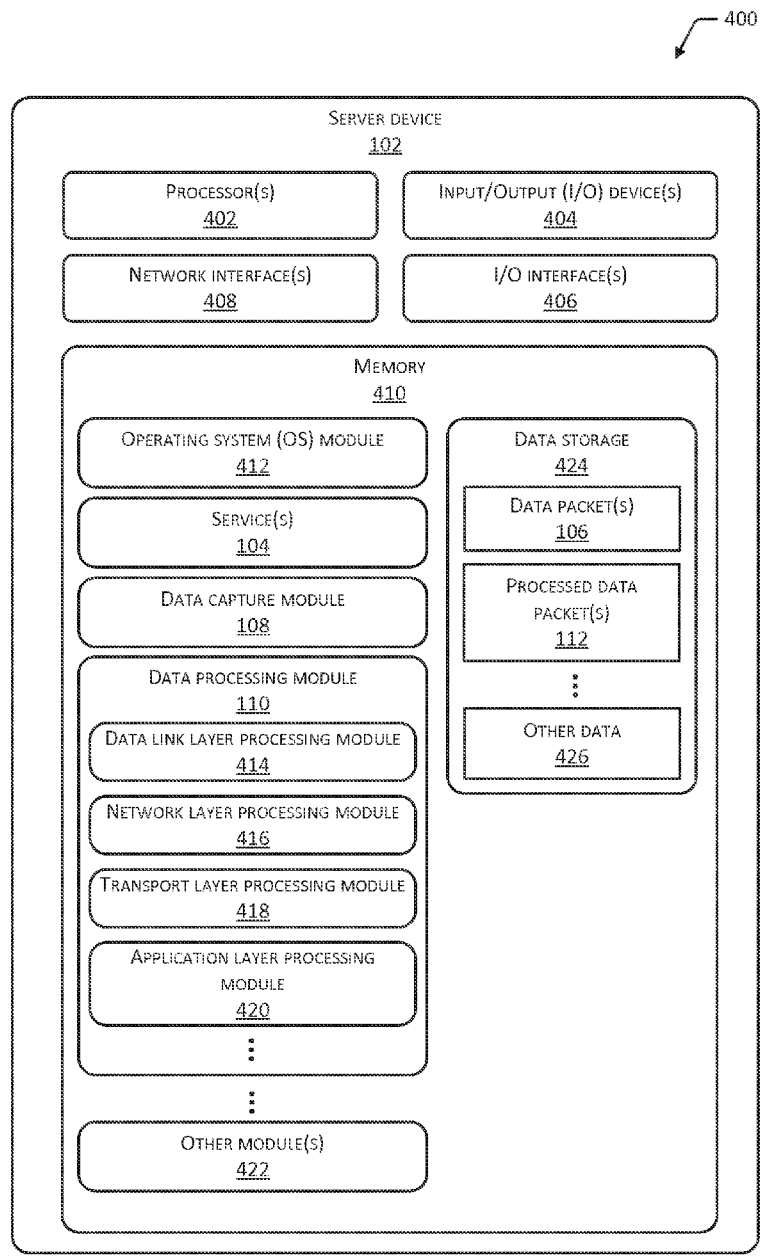
FIG. 4 depicts a block diagram of an example server device that may be employed to capture communicated data packets, and to analyze the captured data packets to determine ordered sequences of data packets that correspond to particular connections or communications involving the server device.

FIG. 4 depicts a block diagram 400 of an example server device 102 that may be employed to capture the data packets 106, and to analyze the captured data packets 106 to determine the processed data packets 112 as ordered sequences of the data packets 106 that correspond to particular connections or communications involving the service(s) 104 executing on the server device 102. As shown in the block diagram 400, the server device 102 may include one or more processors 402 configured to execute one or more stored instructions. The processor(s) 402 may comprise one or more cores.

The server device 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the server device 102, or may be externally placed.

The server device 102 may include one or more I/O interfaces 406 to enable components or modules of the server device 102 to control, interface with, or otherwise communicate with the I/O device(s) 404. The I/O interface(s) 406 may enable information to be transferred in or out of the server device 102, or between components of the server device 102, through serial communication, parallel communication, or other types of communication. For example, the I/O interface(s) 406 may comply with a version of the RS-232 standard for serial ports, or with a version of the IEEE 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The server device 102 may also include one or more busses or other internal communications hardware or software that allow for the transfer of data between the various modules and components of the server device 102.

The server device 102 may include one or more network interfaces 408 that enable communications between the server device 102 and other networked devices, such as other server device(s) 102, the system administration device(s) 116, or the communications data storage 114. The network interface(s) 408 may include one or more network interface controllers (NICs) or other types of transceiver devices configured to send and receive communications over a network.

The server device 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, or applications, and other data for the operation of the server device 102.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 410 may include one or more of the modules described above as executing on the server device(s) 102, such as the service(s) 104, the data capture module 108, and the data processing module 110. In some implementations, the data processing module 110 may include any number of sub-modules that may process packet data at various layers of a multi-layer communication model. For example, the data processing module 110 may include one or more of a data link layer processing module 414, a network layer processing module 416, a transport layer processing module 418, or an application layer processing module 420 to process packets at the data link, network, transport, and application layers respectively. The data processing module 110 may also include other sub-modules to process packet data at other layers. The memory 410 may also include one or more other modules 422, such as a user authentication module or an access control module to secure access to the server device 102, and so forth.

The memory 410 may include data storage 424 to store data for operations of the server device 102. The data storage 424 may comprise a database, array, structured list, tree, or other data structure, and may be a relational or a non-relational datastore. The data storage 424 may store one or both of the data packet(s) 106 or the processed data packet(s) 112. Alternatively, one or both of the data packet(s) 106 or the processed data packet(s) 112 may be accessed in active memory of the data processing module 110, to conserve storage space on the server device(s) 102. The data storage 424 may also store other data 426, such as user authentication information or access control data. In some implementations, at least a portion of the information stored in the data storage 424 may be stored externally to the server device 102, on other devices that are accessible to the server device 102 via the I/O interface(s) 406 or via the network interface(s) 408.

Figure 5:
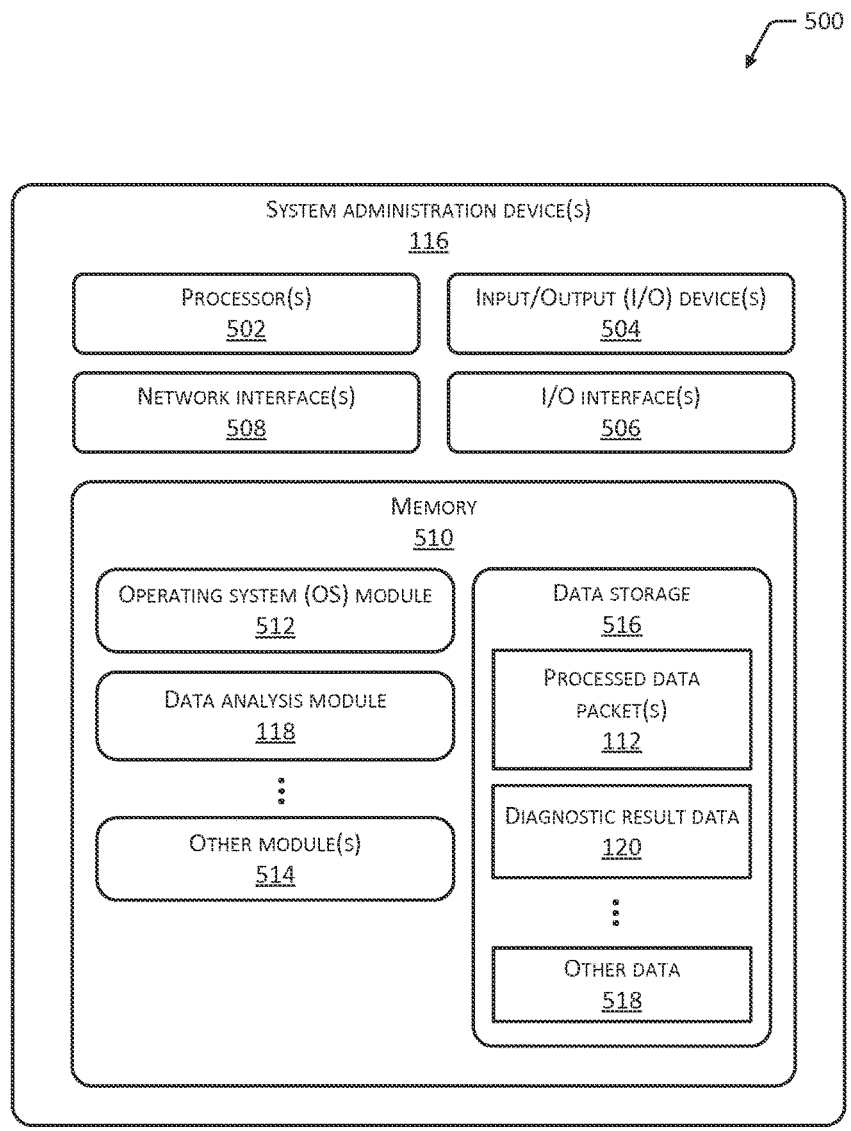
FIG. 5 depicts a block diagram of an example system administration device that may be employed to analyze ordered sequences of data packets that correspond to particular connections, and to diagnose network or communications issues based on the ordered sequences.

FIG. 5 depicts a block diagram 500 of an example system administration device 116 that may be employed to analyze the processed data packets 112 that correspond to particular connections or communications involving the server device 102, and to diagnose network or communications issues based on the processed data packets 112. As shown in the block diagram 500, the system administration device 116 may include one or more processors 502 configured to execute one or more stored instructions. The processor(s) 502 may comprise one or more cores. The system administration device 116 may include one or more I/O devices 504, one or more I/O interfaces 506, and one or more network interfaces 508 as described above with reference to the I/O device(s) 404, the I/O interface(s) 406, and the network interface(s) 408 respectively.

The system administration device 116 may include one or more memories, described herein as memory 510. The memory 510 comprises one or more CRSM. The CRSM may include one or more of an electronic storage medium, a magnetic storage medium, an optical storage medium, a quantum storage medium, a mechanical computer storage medium, and so forth. The memory 510 provides storage of computer-readable instructions, data structures, program modules, and other data for the operation of the system administration device 116. The memory 510 may include an OS module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to OS module 412.

The memory 510 may include any of the modules described above as executing on the system administration device 116, such as the data analysis module 118. The memory 510 may also include one or more other modules 514, such as a user authentication module or an access control module to secure access to the system administration device 116, and so forth.

The memory 510 may include data storage 516 to store data for operations of the system administration device 116. The data storage 516 may comprise a database, array, structured list, tree, or other data structure, and may be a relational or a non-relational datastore. In some implementations, the data storage 516 may store one or more of the processed data packets 112, and may store the diagnostic result data 120. The data storage 516 may also store other data 518, such as user authentication information or access control data. In some implementations, at least a portion of the information stored in the data storage 516 may be stored externally to the system administration device 116, on other devices that are accessible to the system administration device(s) 116 via the I/O interface(s) 506 or via the network interface(s) 508.

Figure 6:
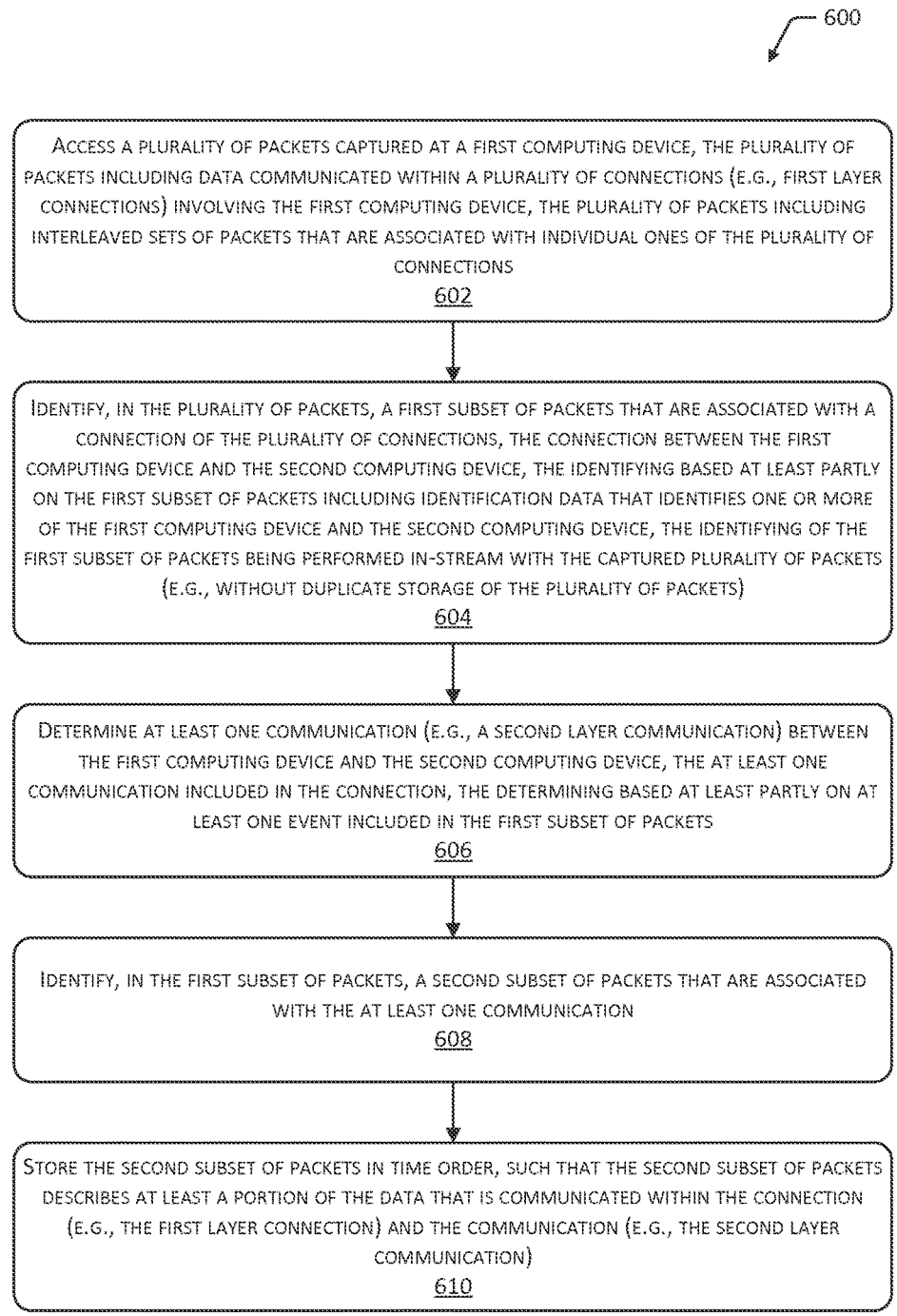
FIG. 6 depicts a flow diagram of a process for processing data packets to extract a first subset of packets that correspond to a connection at a first layer of a multi-layer communication model, and to extract a second subset of packets that correspond to a communication at a second layer of the multi-layer communication model.

FIG. 6 depicts a flow diagram 600 of a process for processing packets to extract a first subset of packets that correspond to a connection at a first layer of a multi-layer communication model, and to extract a second subset of packets that correspond to a communication at a second layer of the multi-layer communication model. One or more operations of the process may be performed by the data processing module 110, other modules of the server device(s) 102, the data analysis module 118, other modules of the system administration device(s) 116, or other modules of other devices.

At 602, a plurality of packets may be accessed. As described above, the accessed packets may include a plurality of data packets 106 that are captured at a first computing device (e.g., the server device 102(1)) by the data capture module 108 and output to the data processing module 110. Alternatively, the accessed packets may include the previously processed data packets 112 stored in the communications data storage 114. In some cases, the plurality of accessed packets may include data that is communicated within a plurality of connections (e.g., first layer connections) involving the first computing device. As described above, the plurality of accessed packets may include packets that are non-contiguous in time and that are associated with individual connections involving the first computing device. The plurality of connections may include transport layer connections or connections at any other layer of the multi-layer communication model.

In some cases, the plurality of captured data packets 106 may include multiple, interleaved sets of packets that are associated with individual connections, as shown in FIG. 2. The plurality of packets may include one or more packets that are were rebroadcast from a sending device. Such rebroadcast packets may be duplicate packets in the captured packet stream, and may be out of order in time. In some cases, the plurality of packets may be received and captured at the server device 102(1) in a random order, or in an indeterminate order compared to an order in which they were originally sent.

At 604, a first subset of packets may be identified within the plurality of packets accessed at 602. The first subset of packets may be a sequence of packets that is associated with a particular connection of the plurality of connections involving the first computing device and a second computing device (e.g., another server device 102). As described above, the sequence of packets may in some cases be out of order in time, non-contiguous, and interleaved with other packets associated with other connections in the originally captured data packets 106. In some implementations, the identifying of the first subset of packets may be based at least partly on each of the first subset of packets including identification data associated with one or both of the first computing device and the second computing device. Identification of the first subset of packets corresponding to a connection is described further with reference to FIGS. 7 and 8.

In some implementations, the first subset of packets may be provided as the processed data packets 112 in an ordered, contiguous sequence of packets to be stored in the communications data storage 114. In this way, implementations may enable the reconstruction and analysis of the connection. Alternatively, in some implementations the first subset of packets may be further processed to determine one or more communications that operate at a higher layer than the connection and that are carried within the connection.

In some implementations, the identifying of the first subset of packets may be performed in-stream within the captured plurality of packets while the data for the packets is in active memory of the process. Such in-stream processing may be independent of any duplication of any portion of the captured plurality of packets. For example, the identifying of the first subset of packets may be performed without creating or storing a copy of any portion of the plurality of packets in memory. Accordingly, implementations may enable the processing of packets while avoiding the consumption of memory resources.

At 606, at least one communication may be determined between the first and second computing devices, or between service(s) 104 executing on the first and second computing devices. The at least one communication may be included in, and carried by, the connection corresponding to the first subset of packets identified at 604. In some cases, the at least one communication may operate at a second layer of the multi-layer communication model whereas the connection that carries the at least one communication operates at a first layer. The second layer may be higher than the first layer within the multi-layer communication model. For example, the connection may be a transport layer connection (e.g., a TCP connection), and the at least one communication may include application layer communication(s) such as HTTP requests and responses. In some implementations, the determining of the at least one communication may be based on analyzing header information at the second layer (e.g., application layer header information) included in the payloads of the first subset of packets. For example, the start of an HTTP communication such as a request or response may be indicated by the designation HTTP/1.0 or another designation in a HTTP header. In some cases, the at least one communication may include a pairing of a HTTP request and a HTTP response responding to the HTTP request. Alternatively, the at least one communication may include a response not paired with a request, or a request not paired with a response.

The end of a communication may be specified with a terminal chunk of length zero, in encoding schemes that employ chunked encoding for a communication (e.g., as in HTTP). The end of the communication may also be determined based on an indication, in the header, of the length of the communication. In some cases, a CLOSE, RESET, or UPDATE event (e.g., TCP events) received in the connection may indicate that a communication carried in the connection is also terminated.

In some implementations, lower layer protocol data (e.g., TCP or other protocol data at the transport layer) may be employed to determine boundaries in the higher layer protocol data (e.g., HTTP or other protocol data at the application layer). In some implementations, the determining of the at least one communication at 606 may be based at least partly on the identification of at least one event included in the first subset of packets corresponding to the connection. In cases where the first subset of packets includes TCP packets, and the connection is a TCP connection, implementations may identify TCP event(s) in the TCP packets. Such TCP events may be employed to determine boundaries (e.g., start, finish, or both start and finish) of the at least one communication at the second layer, such as a HTTP communication. For example, in some cases an application may close or terminate a HTTP communication by requesting the emission of TCP events such as a TCP CLOSE, TCP RESET, or TCP UPDATE. Accordingly, such events identified in the captured plurality of TCP packets may indicate a boundary (e.g., a finish) of the HTTP communication. Further, the identification of a TCP CONNECT event in the captured plurality of TCP packets may indicate a boundary (e.g., a start) of the HTTP communication in addition to, or instead of, the header information described above. Thus, although the transmitted data at the lower layer (e.g., the transport layer) may seem to indicate a substantially continuous stream of information, implementations may employ the events at the lower layer to identify a plurality of higher layer communications (e.g., application layer communications) that are transported within the lower layer connection.

In some cases, as described above, the HTTP header may include information describing size (e.g., a number of bytes) of the HTTP communication. Detection of a TCP CLOSE, TCP RESET, TCP UPDATE, or other events may signal a termination of the HTTP communication even before the initially designated number of bytes has been sent in the communication. Because implementations enable boundaries of higher layer communications (e.g., HTTP communications) to be determined based on lower layer events (e.g., TCP events), and because lower layer packets (e.g., TCP packets) may be determined as including higher layer communications (e.g., HTTP communications), implementations may be described as providing a bidirectional processing of information between at least two layers of a multi-layer communication model.

At 608, based on the identification of the beginning and end of the at least one communication carried in the connection, a second subset of packets may be identified as including information associated with the at least one communication. The second subset of packets may be a subset of the first subset of packets. In some cases, the second subset of packets may include all of the first subset of packets.

At 610, the second subset of packets may be provided as the processed data packets 112 for storage in the communications data storage 114. The second subset of packets may be provided as a time-ordered, contiguous sequence of packets to be stored. Because implementations may determine the second subset of packets as an ordered sequence of packets carrying data for both the connection and the at least one communications, storage of the second subset of packets may include streaming the (e.g., already) time-ordered subset of packets to a storage device without additional processing to re-sequence the packets. In this way, implementations may enable the reconstruction and analysis of the at least one communication corresponding to the second subset of packets, based on the stored data that includes data at multiple layers such as the transport layer, the application layer, or other layers of the multi-layer communication model.

Although the above description refers to a first layer and a second layer, the designation of first and second in this context indicates that the two layers are different layers of a multi-layer communication model. First layer and second layer are not limited to the lowest layer (e.g., the physical layer) and the second lowest layer (e.g., the data link layer) of a multi-layer communication model. For example, in some cases the first layer as described above may be the transport layer, described as the third layer of the OSI model. The second layer as described above may be the application layer, described as the seventh layer of the OSI model.

Figure 7:
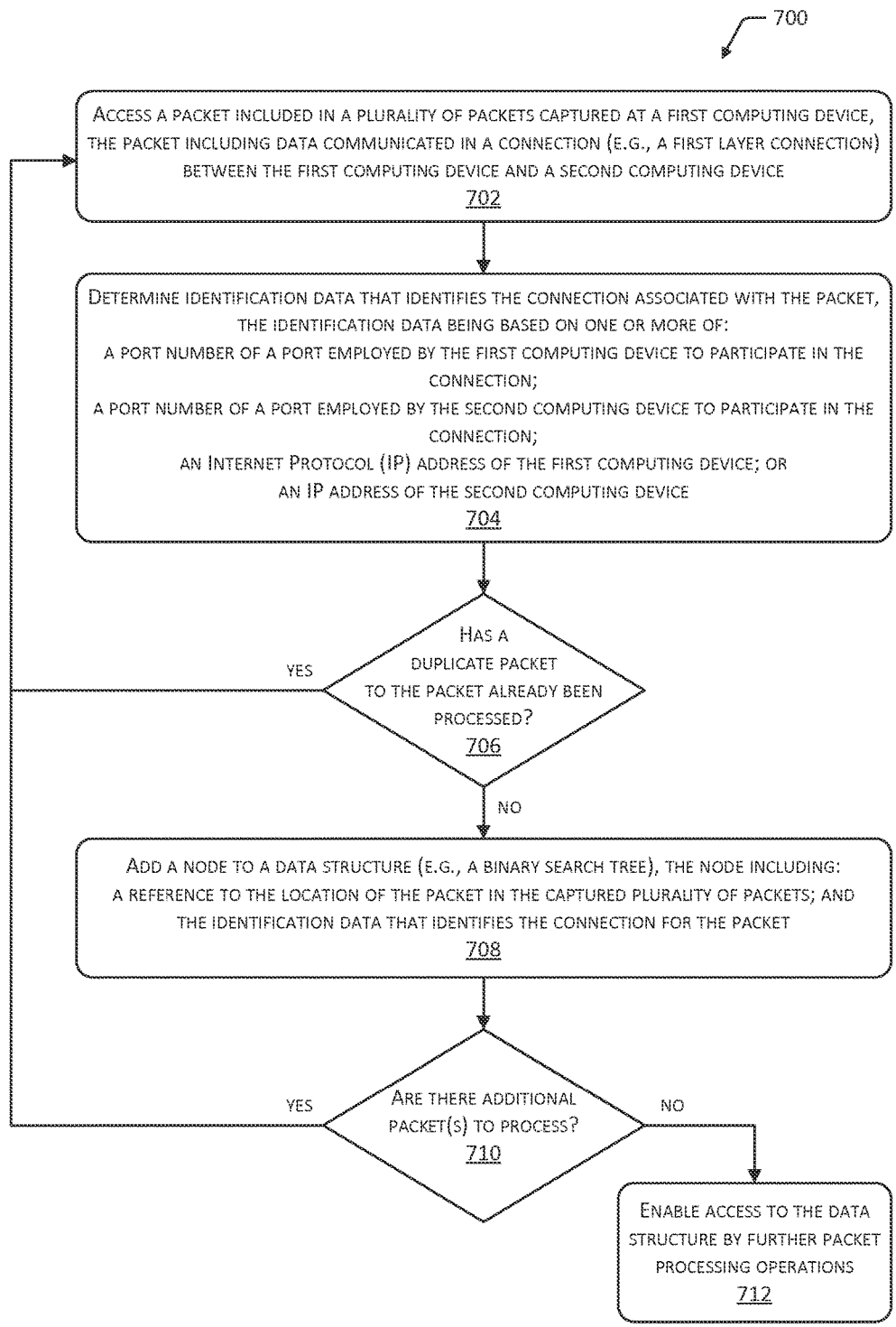
FIG. 7 depicts a flow diagram of a process for generating a data structure of nodes that include references to data packets and that identify a connection associated with the referenced data packets.

FIG. 7 depicts a flow diagram 700 of a process for generating a data structure of nodes that include references to the data packets 106 and that identify a connection associated with the referenced data packets 106. One or more operations of the process may be performed by the data processing module 110, other modules of the server device(s) 102, the data analysis module 118, other modules of the system administration device(s) 116, or other modules of other devices.

At 702, a packet is accessed, the packet included in a plurality of packets captured at a first computing device as described above. The packet may include information communicated in a first layer connection (e.g., a transport layer connection) between the first computing device and a second computing device.

At 704, a determination is made of identification data that uniquely identifies or that otherwise corresponds to the connection that carried the packet accessed at 702. In some implementations, the identification data may be based on one or more of the following: a port number of a communication port employed by the first computing device to participate in the connection; a port number of a communication port employed by the second computing device to participate in the connection; an IP address of the first computing device; or an IP address of the second computing device. Implementations may employ any of these data elements, in any combination or in any order, to generate the identification data that identifies the connection. For example, in some implementations the identification data may be a concatenation of the local port number (e.g., the port number used by the first computing device) and the remote IP address (e.g., the IP address of the second computing device). Alternatively, the identification data may be a concatenation of the numerically lower port number of the two port numbers with the numerically lower IP address of the two IP addresses.

In some implementations, at 706 a determination is made whether a duplicate packet to the current packet has already been processed. If so, the process may return to 702 and begin processing another packet. If not, the process may proceed to 708. In this way, implementations may avoid the inclusion of duplicate packets in the processed data packets 112 that are stored for further analysis.

At 708, a node is added to a data structure, the node including a reference (e.g., a pointer) to the location of the packet in the plurality of captured packets. The node may also include the identification data identifying the connection that carried the packet, as determined at 704. Implementations support any type of data structure. For example, the data structure may be a binary search tree. In some implementations, additional nodes may be added to the data structure to indicate status events for the connection. For example, nodes may be added that indicate events experienced by the connection, such as TCP events. The nodes for such events may also include the identification data that identifies the connection. Such events may be determined by analyzing the first layer packets included in the payloads of the captured data packets 106. In cases where the connection is a TCP connection and the first layer packets are TCP packets, TCP CONNECT, TCP CLOSE, TCP UPDATE, or TCP RESET events for the connection may be signaled as flags included in the TCP packets. Such flags may be added into the TCP packets transmitted within a TCP connection when the TCP connection experiences a connection, close, or reset event. By including nodes for such events in the data structure, implementations enable a reconstruction of the connection that includes all the events experienced by the connection, enabling a more accurate diagnosis of problems with the connection. As described above with reference to FIG. 6, the event information may also be employed to determine boundaries for the at least one communication at the second layer, such as at least one HTTP communication.

At 710, a determination is made whether there are one or more additional packets to process in the plurality of packets. If so, the process may return to 702. If not, the process may proceed to 712. At 712, access to the data structure may be enabled for additional packet processing operations such as those described with reference to FIG. 8.

Figure 8:
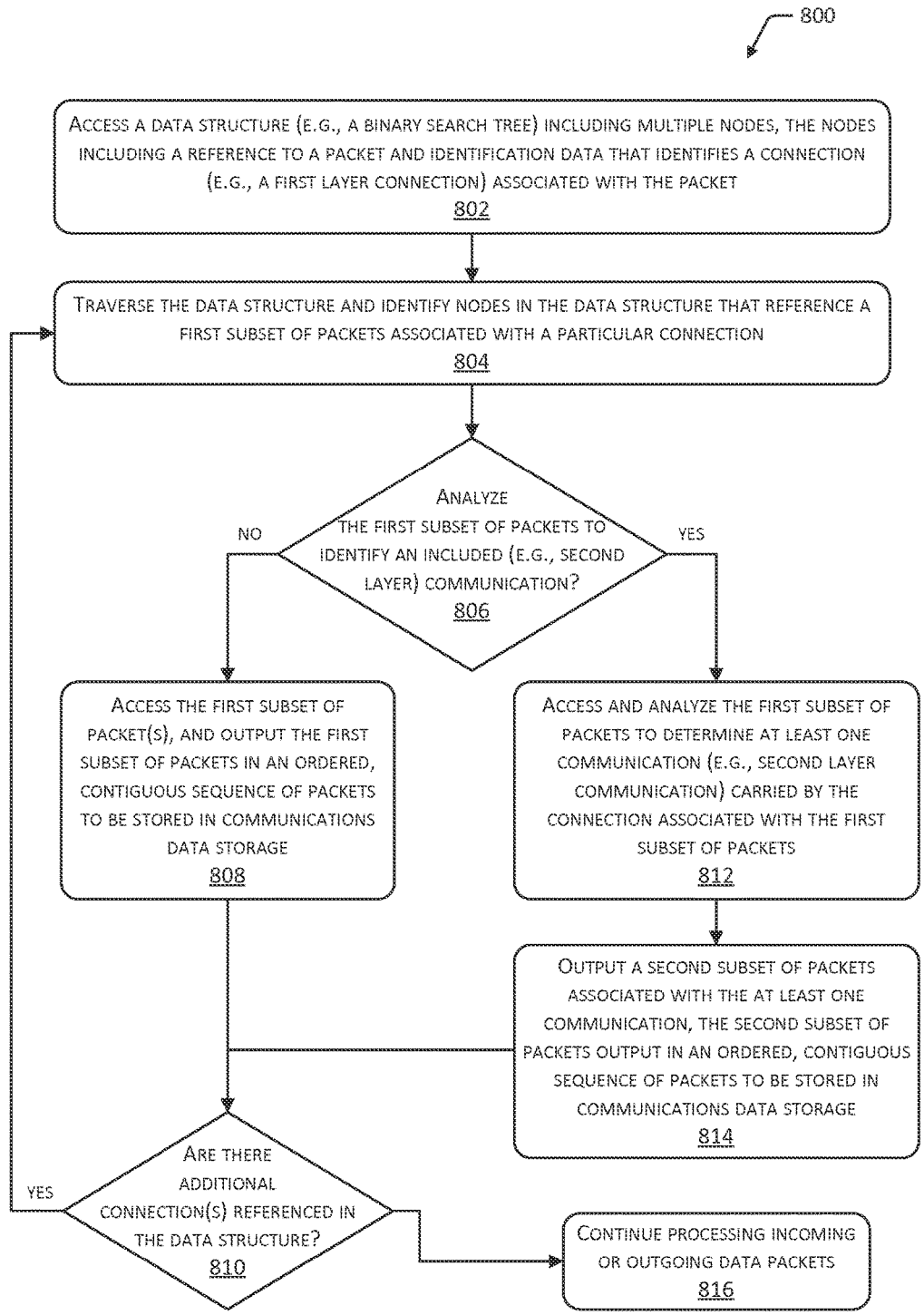
FIG. 8 depicts a flow diagram of a process for analyzing the data structure to determine a subset of data packets that are associated with a particular connection or communication.

FIG. 8 depicts a flow diagram 800 of a process for determining a subset of the captured data packets 106 that are associated with a particular connection. One or more operations of the process may be performed by the data processing module 110, other modules of the server device(s) 102, the data analysis module 118, other modules of the system administration device(s) 116, or other modules of other devices.

At 802, a data structure is accessed. The data structure may be that generated as described with reference to FIG. 7. As described above, the data structure may include multiple nodes where each node includes a reference to the location of a packet and identification data that identifies a connection that carried the packet. In some implementations, the data structure may be a binary search tree.

At 804, the data structure may be traversed to identify nodes in the data structure that reference a first subset of packets associated with a particular connection. For example, the traversal may start at the top of the data structure with the first node that is associated with a first connection. The data structure may then be traversed to identify other nodes associated with the first connection.

At 806, a determination is made whether the first subset of packets is to be further analyzed to identify one or more communications carried by the connection. If not, the process may proceed to 808. At 808, as the data structure is being traversed each of the first subset of packets associated with the connection may be output in an ordered, contiguous sequence of packets for storage in the communications data storage 114. As each packet is output, the node corresponding to that packet may be removed from the data structure. The process may then proceed to 810.

If at 806 the determination is made that the first subset of packets is to be further analyzed to identify one or more communications carried by the connection, the process may proceed to 812. At 812, the first subset of packets may be analyzed to determine at least one communication carried by the connection. Such a determination may proceed as described above with reference to FIG. 6. At 814, a second subset of packets associated with the at least one determined communication may be output in an ordered, contiguous sequence of packets to be stored in the communications data storage 114. As each packet is output, the node corresponding to that packet may be removed from the data structure. The process may then proceed to 810.

At 810, a determination may be made whether there are one or more additional connections referenced in the data structure. In some cases, so long as the data structure includes one or more nodes (e.g., is not null), there may be additional connections referenced in the data structure. If there are additional connections referenced in the data structure, the process may return to 804 and begin traversing the data structure again to output another subset of packets corresponding to another connection or another communication. If there are no additional connections referenced in the data structure, the process may proceed to 816 and continue processing incoming or outgoing data packets 106 captured at the first computing device.

The data structure described with reference to FIGS. 7 and 8 may include nodes which reference the locations of packets in the captured plurality of data packets 106 (e.g., in the stream of captured packets), but that may not include copies of the data in the data packets 106. Some implementations may reconstruct the sets of packets for particular connections through use of the data structure, in some cases independently of any duplicate storage of a portion of the data packets 106 being analyzed. Accordingly, some implementations may enable the processing of the data packets 106 in an efficient manner by mitigating the consumption of additional storage resources on the server device 102.

Figure 9:
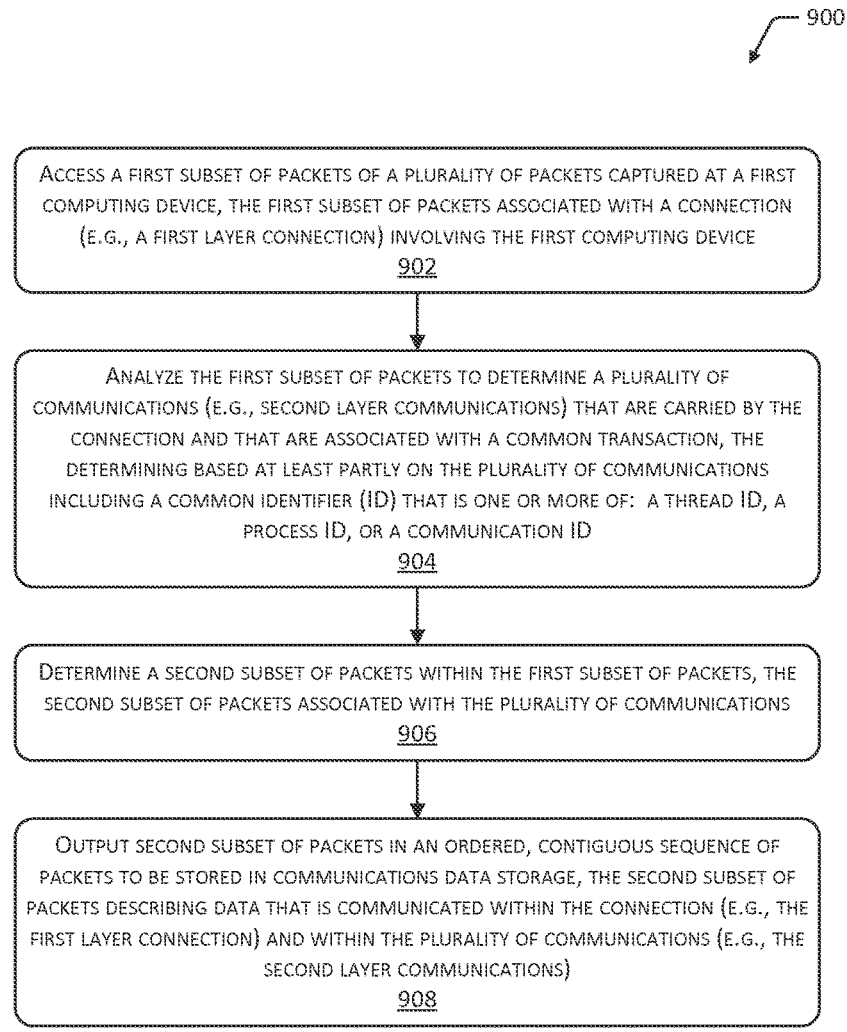
FIG. 9 depicts a flow diagram of a process for identifying multiple communications that are associated with a transaction and for determining a subset of data packets corresponding to the multiple communications.

FIG. 9 depicts a flow diagram 900 of a process for identifying multiple communications that are associated with a transaction. One or more operations of the process may be performed by the data processing module 110, other modules of the server device(s) 102, the data analysis module 118, other modules of the system administration device(s) 116, or other modules of other devices.

In some cases, multiple application layer communications may arise from, or otherwise be associated with, a single transaction. For example, within a distributed system handling e-commerce operations, a service X may receive a request A from a service Y, in which the service Y requests data describing a purchase identified by a purchase identifier (ID). On receiving the request A, the service X may generate a request B to a database requesting the purchase record based on the purchase ID. In response to the request B, the database may send a response C that includes the purchase record. The purchase record may include a customer address ID instead of the full alphanumeric text of the customer's address. Accordingly, to populate the address information the service X may generate a request D to a database requesting the customer address record based on the customer address ID. In response to the request D, the database may send a response E that includes the customer address record. The service X may incorporate the customer address information into the purchase information, and send the purchase information in a response F responding to the original request A from the service Y. In this example, the single transaction (e.g., the original request for purchase data) spawns at least six different communications between various services.

In some implementations, the processed data packets 112 for multiple, related communications may be stored in the communications data storage 114. The storage of packets associated with multiple, related communications may enable the analysis and diagnosis of problems that may occur within such multi-communication transactions, given that data corruption in a first related communication may lead to a problem that manifests itself within a second related communication.

At 902, a first subset of packets may be accessed. As described above, the first subset of packets may be a subset of the captured plurality of data packets 106, and the first subset of packets may be associated with a connection involving a first computing device.

At 904, the first subset of packets may be analyzed to determine a plurality of communications carried by the connection and related through a common transaction. As described above, the connection may be at a first layer of a multi-layer communication model such as the transport layer, and the communications may be at a higher, second layer such as the application layer. In some implementations, the determination that the communications are related through a common transaction may be based on identifying a common identifier within the data corresponding to each of the communications. This common identifier may include one or more of the following: a thread ID that identifies a programmatic thread that handled the common transaction, a process ID that identifies a process (e.g., a service 104) that handled the common transaction, or a communication ID that has been previously designated to identify the multiple communications as related.

At 906, a determination is made of a second subset of packets within the first subset of packets, the second subset of packets including data for the plurality of related communications. At 908, the second subset of packets is output in an ordered, contiguous sequence of packets to be stored as the processed data packets 112 in the communications data storage 114.

Although the examples herein describe the determination of a first subset of packets carried by a first layer connection (e.g., a transport layer connection) and a second subset of packets carried by a second layer communication (e.g., an application layer communication), implementations are not limited to analyzing packets at two layers. In some implementations, the second subset of data packets may be further analyzed to identify further (e.g., higher level) communications that are carried within the second layer communications. For example, in cases where the second layer communications are HTTP communications, such HTTP requests or responses may further carry information related to other application layer protocols or processes such as BSF data or Coral data. In such cases, implementations may analyze the second subset of packets to identify a third subset of packets that carry information for the additional communications carried within the HTTP requests and responses. Such analysis may proceed similarly to the analysis that determines the second subset of packets. Having been identified as carrying data related to the higher layer (e.g., BSF or Coral) processes or protocols, the third subset of packets may be stored as the processed data packets 112 in the communications data storage 114.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Embodiments may be provided as one or more computer program products that include one or more non-transitory computer readable storage media having stored thereon instructions (in compressed or uncompressed form) that may be used to program a computer (or other electronic device) to perform processes or methods described herein. The one or more computer readable storage media may include, but are not limited to, one or more of an electronic storage medium, a magnetic storage medium, an optical storage medium, a quantum storage medium, or a mechanical data storage medium. For example, the one or more computer readable storage media may include, but are not limited to, hard drives, floppy diskettes, optical disks, ROMs, RAMs, EPROMs, EEPROMs, flash memory, magnetic cards, optical cards, solid-state memory devices, or other types of physical media suitable for storing electronic instructions. Further, embodiments may also be provided as one or more computer program products including one or more transitory machine-readable signals in a compressed or an uncompressed form. Such machine-readable signals may or may not be modulated using a carrier. Examples of the machine-readable signals include, but are not limited to, signals that a computing system or other machine hosting or running a computer program may be configured to access. Machine-readable signals may include signals transmitted over one or more networks. For example, a transitory machine-readable signal may comprise transmission of software over a network such as the Internet.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:
1. A computer-implemented method, comprising:
accessing, using one or more processors, a plurality of Transmission Control Protocol (TCP) packets captured at a first computing device, the plurality of TCP packets including interleaved sets of TCP packets that are associated with individual ones of a plurality of TCP connections involving the first computing device;

performing a search to identify, using the one or more processors, in the plurality of TCP packets, a first subset of TCP packets that are associated with a TCP connection of the plurality of TCP connections, the TCP connection being between the first computing device and a second computing device, the identification of the first subset of TCP packets based at least partly on the first subset of TCP packets including identification data associated with one or more of the first computing device and the second computing device, the identification of the first subset of TCP packets being performed in-stream with the captured plurality of TCP packets, wherein the plurality of TCP packets comprises a plurality of subsets of TCP packets, and the plurality of subsets of TCP packets comprises the first subset of TCP packets;

determining, using the one or more processors, at least one Hypertext Transfer Protocol (HTTP) communication between the first computing device and the second computing device, the at least one HTTP communication included in the TCP connection, the determining the at least one HTTP communication based at least partly on at least one TCP event in the first subset of TCP packets associated with the TCP connection;

identifying, using the one or more processors, a second subset of TCP packets that are associated with the at least one HTTP communication, wherein the second subset of TCP packets represents a portion of the packets in the first subset of TCP packets;

storing, using the one or more processors, the second subset of TCP packets in time order, such that the second subset of TCP packets describes at least a portion of data that is communicated within the TCP connection and within the at least one HTTP communication, the time order indicative of a time the second subset of TCP packets were captured; and after the storing, using the second subset of TCP packets to diagnose problems manifested at a first layer but detected at a second layer.

2. The method of claim 1, wherein the plurality of TCP packets is captured by a data capture module that executes on the one or more processors of the first computing device, the data capture module executing separately from at least one process involved in the at least one HTTP communication between the first computing device and the second computing device.

3. The method of claim 1, wherein the identification of the first subset of TCP packets, performed in-stream with the captured plurality of TCP packets, further comprises:

constructing a binary search tree in which nodes of the binary search tree include references to locations of individual TCP packets in the captured plurality of TCP packets; and traversing the binary search tree to identify the first subset of TCP packets associated with the TCP connection.

4. The method of claim 1, wherein the identification data is based at least partly on one or more of:

a first port number of a first port employed by the first computing device during communication of the first subset of TCP packets;

a first Internet Protocol (IP) address of the first computing device;

a second port number of a second port employed by the second computing device during communication of the first subset of TCP packets; or a second IP address of the second computing device.

5. One or more non-transitory computer-readable media storing instructions which, when executed by at least one processor, instruct the at least one processor to perform actions comprising:

accessing a plurality of packets including interleaved sets of packets that are associated with individual ones of a plurality of transport layer connections involving a first computing device;

performing a search to identify, in the plurality of packets, a first subset of packets that are associated with a transport layer connection of the plurality of transport layer connections, the transport layer connection being between the first computing device and a second computing device, wherein the plurality of packets comprises a plurality of subsets of packets, and the plurality of subsets of packets comprises the first subset of packets;

determining at least one application layer communication between the first computing device and the second computing device, the at least one application layer communication included in the transport layer connection, the determining the at least one application layer communication based at least partly on at least one transport layer event in the first subset of packets associated with the transport layer connection;

identifying a second subset of packets that are associated with the at least one application layer communication, wherein the second subset of packets represents a portion of the packets in the first subset of TCP packets;

storing the second subset of packets in an ordered, contiguous sequence, such that the second subset of packets describes at least a portion of data that is communicated within the transport layer connection and within the at least one application layer communication; and after the storing, using the second subset of TCP packets to diagnose problems manifested at a first layer but detected at a second layer.

6. The one or more non-transitory computer-readable media of claim 5, wherein the identification of the first subset of packets is based at least partly on the first subset of packets including identification data that identifies one or more of the first computing device and the second computing device.

7. The one or more non-transitory computer-readable media of claim 5, wherein the determining the at least one application layer communication is further based at least partly on analyzing application layer header information included in the first subset of packets.

8. The one or more non-transitory computer-readable media of claim 5, wherein:

the at least one application layer communication includes a plurality of application layer communications that are associated with a common transaction; and the determining the at least one application layer communication further comprises determining the plurality of application layer communications based at least partly on the plurality of application layer communications including a common identifier.

9. The one or more non-transitory computer-readable media of claim 8, wherein the common identifier includes one or more of:

a process identifier that identifies a process that employs at least one of the plurality of application layer communications;

a thread identifier that identifies a thread that employs at least one of the plurality of application layer communications; or a communication identifier assigned to the plurality of application layer communications.

10. The one or more non-transitory computer-readable media of claim 5, wherein:

the plurality of packets are Transmission Control Protocol (TCP) packets;

the plurality of transport layer connections are TCP connections; and the at least one application layer communication is at least one Hypertext Transfer Protocol (HTTP) communication.

11. The one or more non-transitory computer-readable media of claim 5, wherein the identification of the first subset of packets is performed in-stream with the plurality of packets, and independently of a re-storage of the plurality of packets.

12. A system, comprising:

at least one memory storing computer-executable instructions; and at least one processor in communication with the at least one memory, the at least one processor configured to access the at least one memory and execute the computer-executable instructions to perform actions comprising:

accessing a plurality of packets including interleaved sets of packets that are associated with individual ones of a plurality of connections involving a first computing device, the plurality of connections operating at a first layer of a multi-layer communication model;

performing a search to identify, in the plurality of packets, a first subset of packets that are associated with a connection of the plurality of connections, the connection being between the first computing device and a second computing device, wherein the first subset of packets is one of a plurality of subsets of packets in the plurality of packets;

determining at least one communication between the first computing device and the second computing device, the at least one communication included in the connection and operating at a second layer of the multi-layer communication model that is a higher layer than the first layer;

identifying a second subset of packets that are associated with the at least one communication, wherein the second subset of packets represents a portion of the packets in the first subset of packets;

storing the second subset of packets in an ordered, contiguous sequence, such that the second subset of packets describes at least a portion of data that is communicated within the connection and within the at least one communication; and after the storing, using the second subset of TCP packets to diagnose problems manifested at one layer but detected at another layer.

13. The system of claim 12, wherein the determining the at least one communication is based at least partly on identifying at least one event in the first subset of packets associated with the connection, the at least one event operating at the first layer of the multi-layer communication model.

14. The system of claim 13, wherein:

the first subset of packets are Transmission Control Protocol (TCP) packets; and the at least one event is at least one TCP event, including one or more of a TCP RESET event, a TCP UPDATE event, a TCP CLOSE event, or a TCP CONNECT event.

15. The system of claim 12, wherein:

the identification of the first subset of packets is based at least partly on the first subset of packets including identification data, the identification data including one or more of:

a first port number of a first port employed by the first computing device during communication of the first subset of packets;

a first Internet Protocol (IP) address of the first computing device;

a second port number of a second port employed by the second computing device during communication of the first subset of packets; or a second IP address of the second computing device.

16. The system of claim 15, wherein the identification data is a concatenation of the first port number and the second IP address.

17. The system of claim 15, wherein the identification data is a concatenation of:

a port number that is a lesser of the first port number and the second port number; and an IP address that is a lesser of the first IP address and the second IP address.

18. The system of claim 12, wherein:

the first layer is a transport layer of the multi-layer communication model; and the plurality of connections are a plurality of transport layer connections operating at the transport layer.

19. The system of claim 12, wherein:

the second layer is an application layer of the multi-layer communication model; and the at least one communication is at least one application layer communication operating at the application layer.

* * * * *